United States Patent [19]

Ebert

[11] 4,268,566

[45] May 19, 1981

[54] MARKING TAPE AND METHOD

[76] Inventor: Jack E. Ebert, 103 W. Stratford Pl., Mt. Prospect, Ill. 60056

[21] Appl. No.: 818,386

[22] Filed: Jul. 25, 1977

[51] Int. Cl.[3] ........................... B32B 3/00; B05D 5/00

[52] U.S. Cl. .................................... 428/195; 156/234; 427/261; 428/202; 428/207; 428/211; 428/343; 428/40; 428/914

[58] Field of Search ............... 428/195, 202, 207, 211, 428/343, 352, 914, 40; 427/261; 156/234

[56] References Cited

U.S. PATENT DOCUMENTS 2,818,349 12/1957 Bergstedt et al. ............. 428/343 X
3,131,106 4/1964 Mackenzie ...................... 428/343 X
3,909,329 9/1975 Smolen .......................... 428/343 X
3,931,426 1/1976 Braun et al. ......................... 428/40

*Primary Examiner*—Thomas J. Herbert, Jr.
*Attorney, Agent, or Firm*—Darbo & Vandenburgh

[57] ABSTRACT

A length of thin, flexible, inexpensive adhesive-backed product has marking means on the front side. The product is affixed by the adhesive to a surface along a feature of the surface at a particular location, thus enabling a unit of material which is to be marked and cut to be put in position and pressed against the marking means thereby marking the material to match the feature of the surface.

8 Claims, 6 Drawing Figures

Fig. 1.
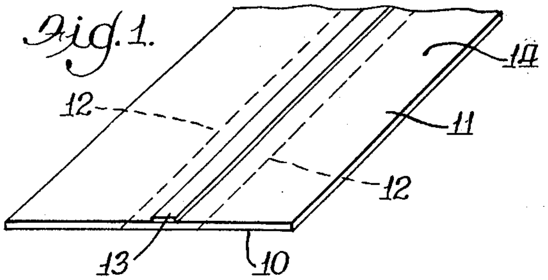
Fig. 2.
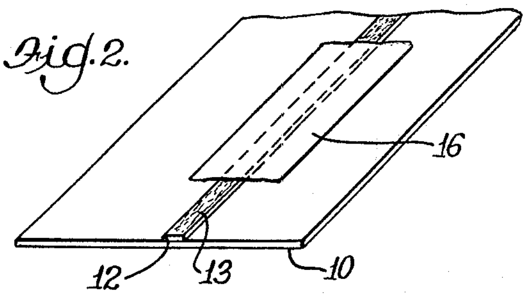
Fig. 3.
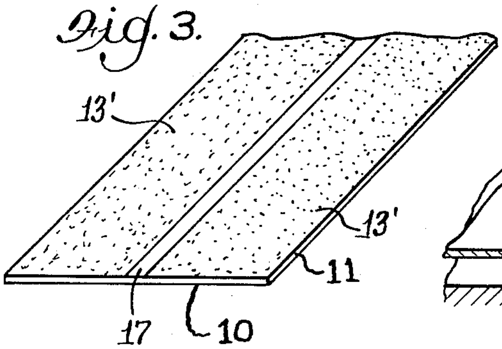
Fig. 4.
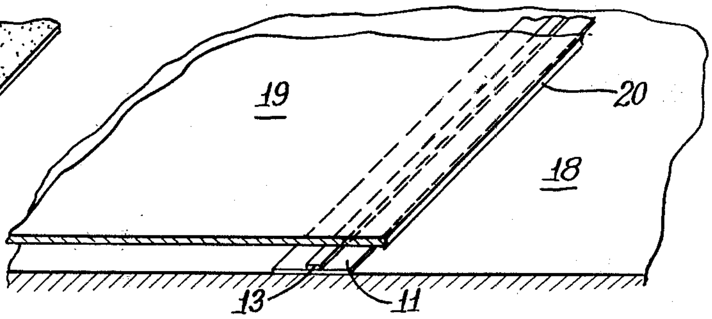
Fig. 5.
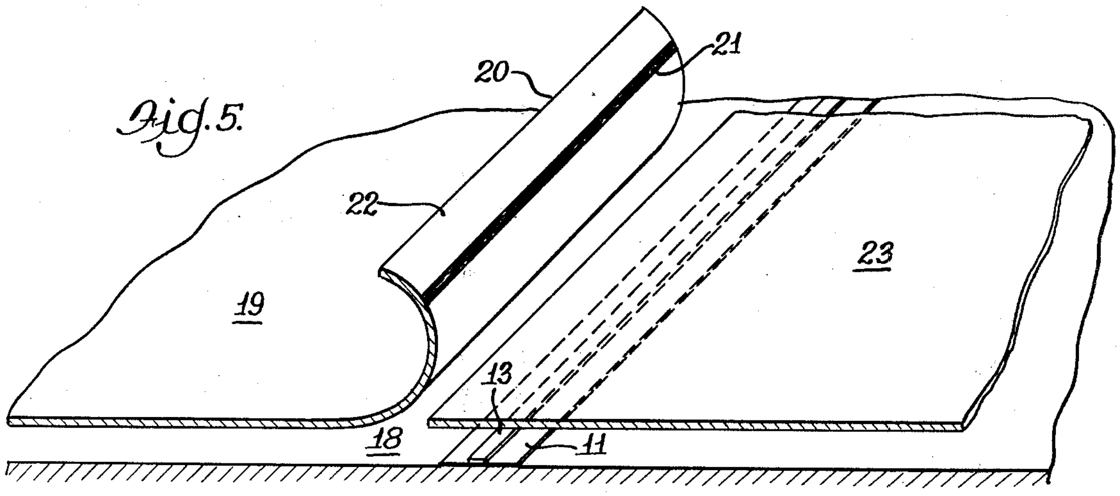
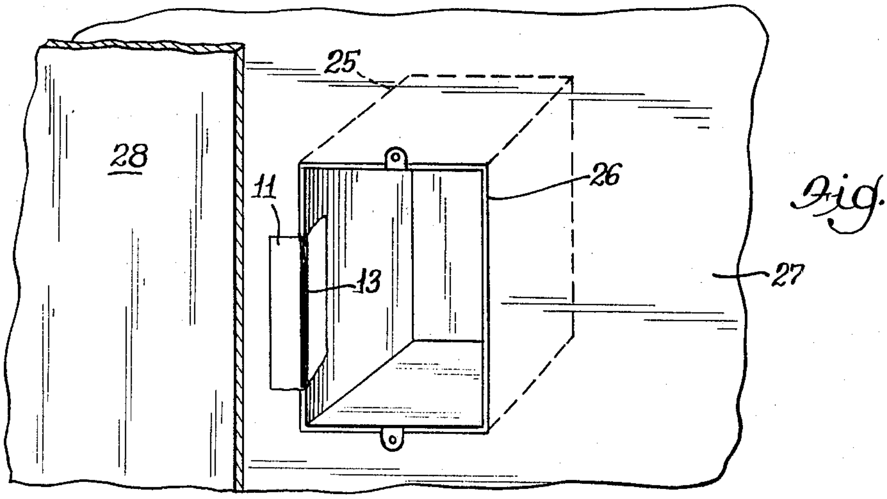
Fig. 6.

MARKING TAPE AND METHOD

BACKGROUND AND SUMMARY OF THE INVENTION

Conforming the shape of one piece of material to a feature on a surface in an accurate manner poses difficulties when the first piece cannot be placed on the surface and at the same time be marked on its backside. Such a situation exists when placing dry wall, paneling, or the like on a wall with a protruding or a recessed object, such as an electrical box, or when placing ceiling tile on a ceiling with an air vent, pipe, duct, or the like. Similarly, when two pieces of material are being placed so as to abut each other at a certain point, it is difficult to cut the two pieces accurately, especially when the pieces to be abutted are pliable and bulky, making specific measurements very difficult to obtain. An example of this latter situation is the laying of carpeting, where two pieces are to meet in a doorway or elsewhere.

Many and varied time-consuming measurements must often be made during the fitting procedure, sometimes requiring a degree of skill and craftsmanship beyond that of the average person. In laying carpet for example, the carpet pieces are to meet but not overlap and the point of abutment is usually to be in a specific place. Taking measurements from a wall behind the edge of the carpet to be cut is time-consuming and inaccurate. The usual means of forming the abutment is by line-of-sight or by physically drawing a line on the back of the carpet by positioning the carpet, bending it back as closely as possible to the place where it is to be cut, and then drawing a line. Frequently, the resulting cut edge is curved rather than straight. Thus the carpet seam may be apparent, an undesirable situation.

In installing wall covering of any type, measurements must be made when a recessed or protruding object is met, such as an electrical box. These measurements are needed to determine where to cut the material being installed so as to fit around the object.

The present invention enables the installation of such materials in a faster, more accurate fashion requiring less skill. A product made of a long, thin material has an adhesive backing. The obverse side is partly covered by a marking means, which may be felt or blotter paper or the like permeated by an ink or other marking substance. The marking means may include encapsulated ink which is released when pressure is applied.

The product is affixed by its adhesive backing to a surface having a feature to which a unit of material must conform so as to fit over the surface. Instead of making measurements on the surface and then transferring these measurements to the unit of material so as to determine where it must be cut to conform with the feature of the surface, the product is simply affixed to the surface at the location of the feature, or else to the protruding object forming the feature. The feature may indeed be a protruding or recessed object such as an electrical box, pipe, air vent, or duct. However, the feature may merely be a specific location where the conforming unit of material is to stop when permanently placed on the surface. An example is two pieces of carpet abutting at a door frame. There the feature is merely an imaginary line on the floor or padding where the pieces are to meet.

With the product affixed to the feature or the surface, the unit of material is positioned in the desired location, with its backside facing the surface to which the unit will conform. The unit is then pressed against the marking means on the product causing the product to mark a line on the backside of the unit, which line is then used as a guideline in cutting the unit to conform to the surface with its feature.

This method and product significantly reduce the time needed for performing what is otherwise a slow process. The procedure is accurate and takes less skill to perform. Thus, not only is the invention of use to tradesmen, but also to the consumer desiring to do such work himself. The product may be packaged in convenient rolls. To protect the marking means a thin layer of material may be placed over the marking area and removed before use. In another species the product is protected by omitting adhesive from that portion of the backing which comes in contact with a marking means when the product is rolled up.

DESCRIPTION OF THE DRAWINGS

FIG. 1 is an isometric view of one embodiment;

FIG. 2 is an isometric view of a second embodiment;

FIG. 3 is an isometric view of a third embodiment;

FIG. 4 is an isometric view showing the use of the embodiment of FIG. 1 in marking a material such as carpeting;

FIG. 5 is a view corresponding to FIG. 4 with one piece of material already marked and cut and another piece of material to be marked to abut the first; and FIG. 6 is a view of the product affixed to a surface about an electrical box for use in marking paneling or wallboard to fit about the box.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The present invention provides a special marking tape, one embodiment of which is shown in FIG. 1. A strip of thin, flexible material 11 has an adhesive 10 on its backside. Flexible material 11 may be paper, cloth or plastic. Preferably the adhesive is pressure sensitive, but a water, etc., soluble adhesive also might be employed. A marking means 13 comprises a narrow strip of felt or blotter paper permeated with ink and is attached to the obverse side 14 of the flexible material. The term "ink" is used broadly herein to identify a coloring substance in a liquid carrier. As an alternative the marking means 13 could be a strip of carbon paper or chalk. The marking means may be, but is not limited to, a straight line, longitudinal orientation. It might, for example, be a line curved to meet a particular requirement. It might be a rectangle the size of an electrical box, for example.

It is contemplated that the marking tape of the invention will be supplied in rolls. To prevent the pressure sensitive adhesive 10 from damaging the marking means 13 when the tape is rolled and unrolled, the adhesive is only adjacent the sides of the flexible material; that is, the central part of the backside of the flexible material between dotted lines 12 is devoid of adhesive. As an alternative, and with the entire backside of the flexible material coated with adhesive, a thin, peel-off strip 16 is placed over the marking means as shown in FIG. 2. The peel-off strip could also be on at least the longitudinal central portion of the adhesive layer 10.

The mark transferred to the conforming unit of material need not be a narrow line, but may rather be two marks with a narrow separation, the separation then defining the "cutting" line. Such a mark could be created by the product illustrated in FIG. 3, where the marking substance 13' is on two different areas of the topside of the product. When the mark is transferred, the narrow area without marking substance 17 serves as the cutting line of the conforming unit of material. The marking means need only be a characteristic defining a line, accomplished by transferring a line or by transferring narrowly separated marks with an unmarked line between them. When used for carpet installation, the defined line should be no greater than one-quarter inch wide. The marking substance 13' in FIG. 3 is an encapsulated ink, such as that commonly used as an alternative for carbon paper. The application of pressure breaks the minute capsules and releases the ink.

FIG. 4 illustrates the FIG. 1 species of marking tape affixed to a surface 18 with the strip of marking means directly over a feature on the surface. For example, the surface is a floor on which carpeting is to be laid and the "feature" is the middle of a doorway between two rooms (or a room and a hall, etc.) where a seam in the carpet is to be made. Carpeting 19, which may be referred to as a unit of material, has been laid in one room and is to be cut in a straight line across the middle of the doorway. When the carpeting was laid in the first room it was cut preliminarily so that its cut edge 20 was beyond the middle of the doorway. With the marking tape in place on the floor, the carpeting is pressed down so that the marking means 13 will apply a mark 21 (FIG. 5) to the back of the carpeting. The excess material 22 is then cut off along the mark 21.

The carpeting 23 is then placed in the other room (if that has not already been done) and when in the proper position it is pressed down on the marking means 13. While the second carpeting 23 is being so marked the first carpeting 19 is held up out of the way, in the general position illustrated in FIG. 5. Thus a line is produced on the back of the second carpeting 23, which line is used as a guide for cutting.

FIG. 6 illustrates an electrical box 25 recessed behind the outer surface of a wall 27. A sheet of paneling 28 is to be affixed on the wall and must have an opening in it which will conform to the opening defined by the front edges 26 of the electrical box. Obviously, when the paneling is in the required position, its backside is not accessible for the marking of the box opening and the front side cannot be marked because the location of the box is concealed by the paneling.

Strips of the marking tape of FIG. 1 are placed around the box so that the marking means 13 is directly over the outer edges 26 of the box. The paneling is then positioned in the required position with respect to the wall and then pressed against the marking means so that marks are made on the back of the paneling corresponding to the location of the outer edges of the box. With the paneling moved away from the wall it is then cut along these lines.

All other potential uses of such a marking tape cannot even be anticipated at the moment. It will likely be useful in producing some types of furniture, etc.

I claim:

1. A product for use in marking a unit of material which is to be positioned with its backside against a surface and the material is to be cut to correspond to a feature at a location on said surface which feature is concealed when said unit is in position and, when in position, said surface renders said backside inaccessible for the marking of the unit, said product comprising:

a length of thin, inexpensive, flexible material with two sides;

a pressure sensitive, transferable marking means on one of said sides, said marking means having a characteristic defining a line; and an adhesive covering at least part of the other of said sides, for affixing the product to the surface, with said defined line at said location;

whereby the product may be affixed to said surface with said line at said location and when said unit of material is placed in position with respect to said surface and pressed toward said surface, the marking means then transfers the characteristic defining the line to said backside of said unit.

2. A product as set forth in claim 1, wherein the marking means comprises an absorbent material having ink therein.

3. A product as set forth in claim 1, wherein the adhesive on the strip is pressure sensitive.

4. A product as set forth in claim 3, wherein the marking means comprises an encapsuled ink.

5. A product as set forth in claim 3 including means for preventing the adhesive from damaging the marking means when the product is rolled up and then unrolled.

6. A product as set forth in claim 5, wherein the last mentioned means is a protective layer of flexible, inexpensive material capable of being removed before use of the product.

7. A product as set forth in claim 5, wherein the last mentioned means comprises an area on said other of said sides which is free of adhesive, said area being directly opposite said marking means.

8. A method for accurately marking a unit of material which is to be installed with its backside against a surface which surface has a feature at a particular location thereon, wherein the unit is to be cut so as to accurately match said feature and the surface being such that the marking of the backside of said unit when in its desired position is prevented by said surface, said method comprising the steps of:

forming a length of thin, inexpensive, flexible material with two sides;

applying an adhesive to at least part of one side of said material;

applying a length of pressure sensitive, transferable marking means to the other side of said material to define a line;

affixing the adhesive covered side of the flexible material to said surface with said line at said location;

placing said unit in the desired position with respect to said surface, with the backside of said unit against said surface and said marking means;

pressing said unit against said surface and said marking means to produce a line on said backside of said unit; and then removing the unit from said surface for cutting along the line to match said feature on said surface.

* * * * *